April 28, 1970 R. A. IGRAS ET AL 3,509,036

CIRCUIT AND COMPONENT THEREOF FOR USE IN ELECTRODEPOSITION OF ORGANIC COATINGS

Filed March 22, 1967 2 Sheets-Sheet 1

RAYMOND A. IGRAS
NORBERT J. MILKE
INVENTORS

BY John R. Faulkner
Olin B. Johnson
ATTORNEYS

RAYMOND A. IGRAS
NORBERT J. MILKE
INVENTORS
BY John R. Faulkner
Olin B. Johnson
ATTORNEYS

United States Patent Office 3,509,036
Patented Apr. 28, 1970

3,509,036

CIRCUIT AND COMPONENT THEREOF FOR USE IN ELECTRODEPOSITION OF ORGANIC COATINGS

Raymond A. Igras and Norbert J. Milke, Dearborn Heights, Mich., assignors to Ford Motor Company, Dearborn, Mich., a corporation of Delaware Filed Mar. 22, 1967, Ser. No. 625,090
Int. Cl. C23b *13/00, 5/70, 5/72*
U.S. Cl. 204—299 4 Claims

ABSTRACT OF THE DISCLOSURE

An electrical circuit for use in electrically inducing deposition of a film-forming organic coating material upon an electrically conductive substrate comprising in combination an aqueous electrolyte having said organic coating material dispersed therein, a first electrode immersed in said electrolyte, a second electrode immersed in said electrolyte and spaced apart from said first electrode, a power source from which electrical energy can be transmitted through said circuit, first conduction means providing means for establishing electrical connection between said power source and said first electrode, second conduction means providing electrical connection between said power source and said second electrode, and detachable connector means for providing electrical connection between said first electrode and said first conduction means, said connector means comprising in combination a connector-conductor, clamping means for holding said connector-conductor in electrical connection with said first electrode and said first conduction means, and resilient shielding means in contact with an substantially encompassing said connector-conductor and shielding at least a portion of said connector-conductor from contact with said coating material when said first electrode, said connector means and said first conduction means are in electrical connection and said first electrode and said connector means are immersed in said electrolyte; and the connector means of said circuit.

This invention relates to the art of coating. In particular, this invention is an improvement in the method and apparatus employed in the coating of electrically conductive objects by electrically induced deposition of an organic coating material from a dispersion thereof in an aqueous bath. More particularly, this invention is concerned with an improved electrical circuit of an electrodeposition cell suitable for carrying out the aforementioned coating process and to a component of such circuit.

Electrophoretic deposition of latex, various waxes, shellac, etc., has been widely disclosed in the literature. More recently, a method of painting has been disclosed wherein film-forming, polycarboxylic acid resins are laid down upon a conductive substrate by electrically induced deposition. Such resins have carboxyl groups in their molecular structure which dissociate in the presence of water and basic dispersal assistants such as water soluble amines. Polycarboxylic acid resins deposit anodically. This method of painting is disclosed by Allan E. Gilchrist in U.S. Patent 3,230,162. The disclosures of this patent are incorporated herein by reference. Cathodically depositable resins have also been disclosed and the circuit and method of this invention is equally applicable to cathodic deposition. Cathodically depositable resins are resins which upon dispersion in the coating bath have ionically positive sites thereon.

The method of coating employing the circuit and circuit component of this invention may be illustrated in the following manner: An object to be painted is immersed in an aqueous bath comprising a dispersion of particles of the film-forming, organic material to be electrodeposited and serves as a first electrode of an electrodeposition cell. A second electrode, which may be the tank retaining the coating bath, is in contact with the bath and is spaced apart from the object to be coated. These electrodes are in electrical connection with opposite terminals of a direct current power source. A difference of electrical potential above the threshold deposition voltage of the coating material to be deposited, e.g. 50 to 1,000 volts, more commonly between about 100 and about 300 volts, is maintained between the electrodes and a direct current of electrical energy is passed between such electrodes and through the bath causing the coating material to deposit upon the object to be coated until such deposition is terminated by the building electrical resistance of the resultant coating, removal of the object from the bath, or by other break in the electrical circuit which comprises the aforementioned electrodes, the electrolyte bath therebetween, the power source and conduction means providing electrical connection between such electrodes and the power source. The coated object is removed from the bath, given a water rinse, and the coating is polymerized, commonly by baking.

In most manufacturing installations wherein this method of painting is employed, the coating is effected in a continuous process wherein the object to be coated is brought over the coating bath suspended from a conveyor from which it is electrically insulated, an electrical contact is established between the object to be coated and the appropriate lead from the power source, the positive lead in the case of anodic deposition, the object still supported by the conveyor is immersed in the bath, coated, and withdrawn from the bath by the conveyor.

Since a continuous stream of such objects pass through the bath to be coated, readily attachable and detachable means are advantageously employed to secure electrical connection between the object to be coated and the proper conductor lead from the power source. With large objects, the electrical current drawn in the coating cycle is necessarily high. Any poor conductor of electric current interposed between the object and the conductor leading to the power source adds resistance, produces heat, and lowers the intended coating voltage. If such resistance is sufficiently high, it can prevent coating altogether. For these reasons, it is important that the detachable connector means be constructed and arranged in a manner such that the area of electrical connection between the object and the conductor through which electrical connection is established with the power source be as free as possible of nonconductive or poorly conductive materials. Maintaining a clean contact area is made difficult by the connecting conductor being of the same polarity as the object to be coated. Those portions of the connecting conductor left exposed to the bath become coated with an insulating film each time the connector is used. In installations wherein this connecting conductor is not removed from the object until after baking, the problem becomes even greater.

In the circuit of this invention, electrical connection between the object to be coated and conduction means leading from the power source is effected by a connector means including a connector-conductor shielded from contact with the bath with a resilient shield which encompasses substantially all of the surface area of the connector-conductor except a contact area for placing the connector-conductor in electrical connection with the object to be coated and a contact area for placing the connector-conductor in electrical connection with conduction means leading to the power source. Detachable clamping means hold in place and secure these connections while the object is being coated.

In a preferred embodiment, the resilient shield comprises a flexible diaphragm, commonly referred to as a suction cup, in which the connector-conductor is centrally positioned and held in water-tight relationship with the shield. In a preferred material embodiment, the resilient shield is formed of a material that is sufficiently heat-resistive that it can be left in contact with the coated object through the backing cycle without deterioration, a material that is unaffected by temperatures up to about 300°–400° F. for conventional paint baking residence times. These shields may be formed from any elastomer having suitable resilience and heat resistance. Shields of conventional silicone rubber have proven quite satisfactory.

Two embodiments of connector means in accordance with this invention are illustrated in the accompanying drawing.

DESCRIPTION OF THE DRAWING

Referring now to FIGURES 1 and 2, there is shown a metal object 11 which is to be immersed in an aqueous electrocoating bath for electrodeposition of paint thereon. A terminal conductor 13 of a power transmission cable 15 is in electrical connection with object 11 via a connector-conductor unit 17. Connector-conductor unit 17 is held in electrical connection with object 11 and terminal conductor 13 by clamping means 19.

Figure 1:
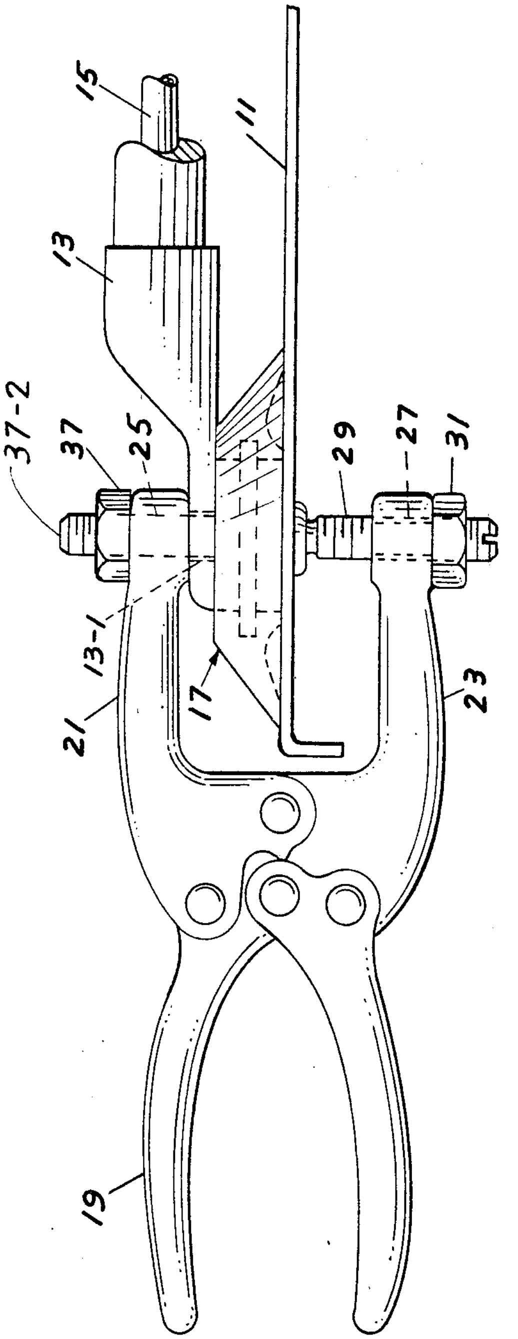
FIGURE 1 is a partially sectional view in side elevation of one embodiment of connector means in accordance with this invention shown holding a workpiece to be painted and a power transmission cable in electrical connection.

In this embodiment, clamping means 19 is a conventional toggle clamp. Clamping means 19 has clamping jaws 21 and 23. Extending through jaws 21 and 23, respectively, are channels 25 and 27. Channels 25 and 27 are each constructed and arranged to admit of the passage of a bolt therethrough. Channel 27 is threaded. Bolt 29 extends through and is in threaded engagement with channel 27. Bolt 29 provides the support means upon the opposite side of object 11 against which the clamping pressure is exerted through jaw 21 upon conductor 13, connector-conductor unit 17, and object 11. Bolt 29 is vertically adjustable within jaw 23 and is secured in position by lock nut 31.

Figure 2:
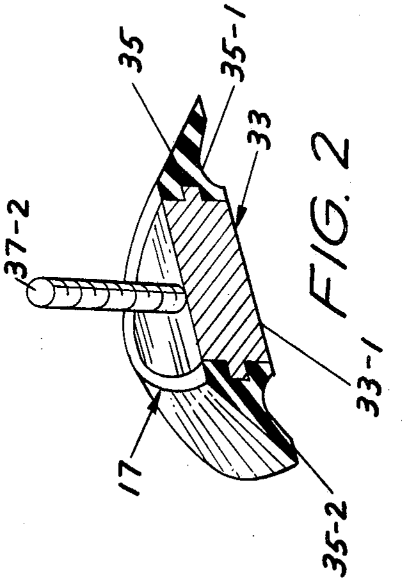
FIGURE 2 is a partially sectional, perspective view of the connector-conductor of FIGURE 1.

Refering now to FIGURE 2, connector-conductor unit 17 comprises connector-conductor 33, a resilient, cup-shaped, diaphragm member 35. Connector-conductor 33 comprises conductor pad 33–1 and conductor bolt 37–2. Pad 33–1 and bolt 37–2 may be integrally formed or bolt 37–2 may be detachably connected with pad 33–1, e.g. in threaded engagement. In this embodiment, terminal conductor 13 has a passageway 13–1 through which bolt 37–2 passes admitting conductor 13 to lay flat upon pad 33–1. Bolt 37–2 passes through channel 25 in upper jaw 21 and is there secured by nut 37.

When connection is made in this embodiment, jaws 21 and 23 are positioned on opopsite sides of a flange or other accessible portion of the object 11. Bolt 37–2 is passed through passageway 13–1 of terminal conductor 13 and channel 25 of jaw 21. This insertion is made and nut 37 is tightened upon bolt 37–2 until terminal conductor 13 is forced tight against the upper surface of pad 33–1 and the lower surface of pad 33–1 is forced tight against object 11 establishing electrical connection between transmission cable 15 and object 11.

In this embodiment, conductor pad 33–1 has a peripheral flange which assists in securing diaphragm member 35 to pad 33–1. Diaphragm member 35 encompasses the vertical walls of pad 33–1 and is provided with a circular channel 35–1 on its lower surface. Outwardly from channel 35–1 is a flexible peripheral lip 35–2. Diaphragm 35 is thus constructed and arranged in a manner such that when pad 33–1 is in place upon object 11 and operational clamping pressure is applied to the upper surface of pad 33–1, diaphragm member 35 provides an essentially water-tight seal with the surface of object 11 preventing paint from the coating bath from contacting the lower surface of pad 33–1.

In this embodiment, clamping means 19 may be a conductor, or those portions thereof which contact the object 11 and those portions thereof which contact terminal conductor 13 may be of insulative material.

After the workpiece has passed through the coating bath, the nut 37 is loosened and terminal conductor 13 is released from the assembly.

Figure 3:
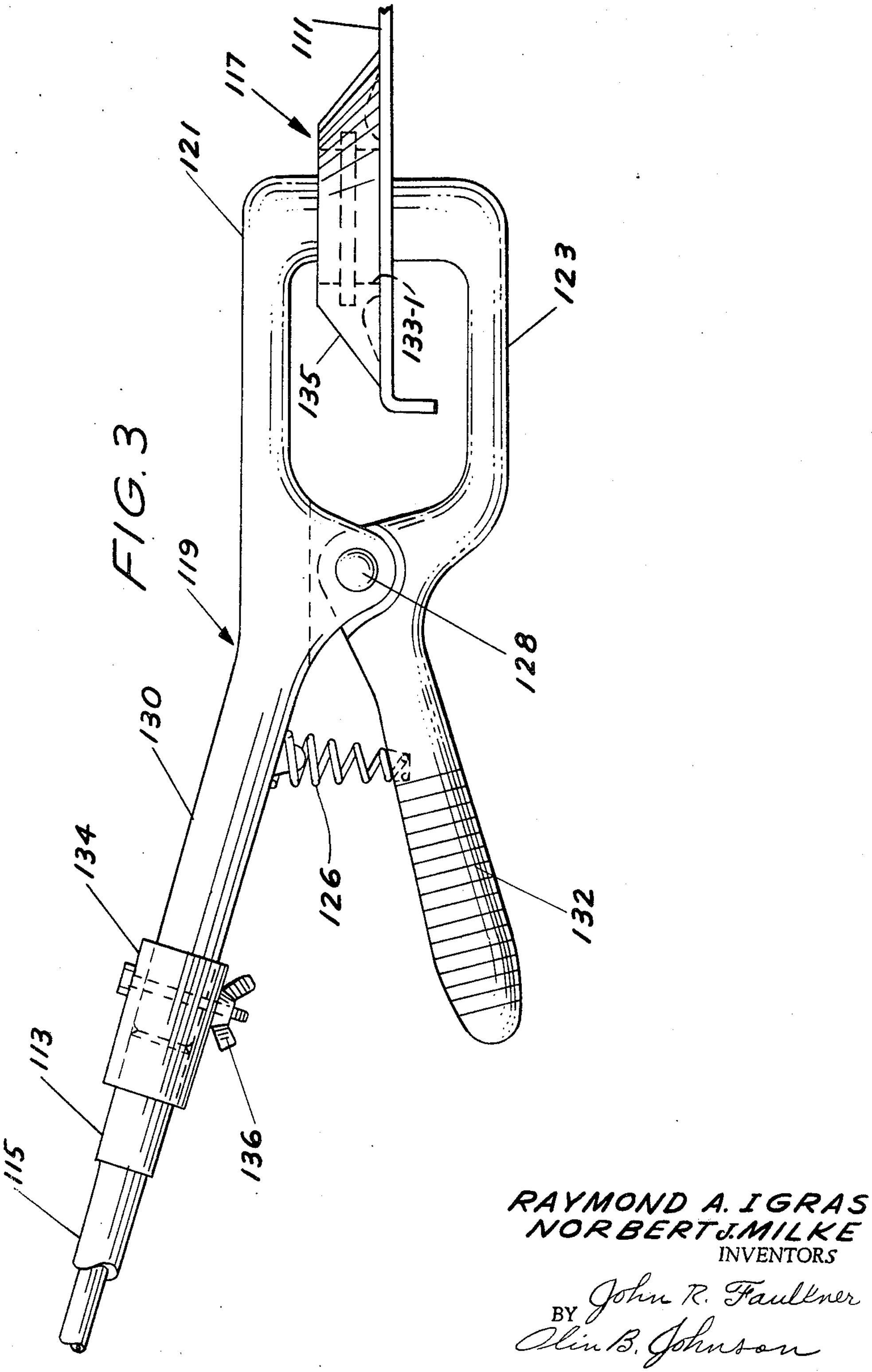
FIGURE 3 is a partially sectional view in side elevation of a second embodiment of connector means in accordance with this invention shown holding a workpiece to be painted and a power transmission cable in electrical connection.

Referring now to FIGURE 3, there is shown a different embodiment of the detachable connector means. In this embodiment, the clamping means 119 is electrically conductive and spring actuated. Clamping means 119 has an upper jaw 121 and a lower jaw 123, a spring actuator 126, a pivot 128, and handles 130 and 132. Clamping means 119 is constructed and arranged in a manner such that, in the absence of external force, spring 126 working against handles 130 and 132 forces jaws 121 and 123 toward a closed position. Gripping pressure is applied to handles 130 and 132 against spring 126 to open the jaws 121 and 123.

Clamping means 119 is detachably placed in electrical connection with terminal conductor 113 of transmission cable 115 with a compressible holding collar 134 which is secured to handle 130 of clamping means 119. Collar 134 is equipped with a conventional locking mechanism here indicated by threaded, locking means 136. Locking means 136 when tightened with conductor 113 positioned within collar 134, compresses collar 134 so as to hold conductor 113 in electrical connection with clamping means 119.

In this view, clamping means 119 is shown in closed position holding connector-conductor unit 117 in electrical connection with a workpiece 111. In this embodiment, the conductor pad 133–1 of connector-conductor 117 may be permanently secured to and in electrical connection with clamping jaw 121. Thus pad 133–1 and jaw 121 may be integrally formed or pad 133–1 may be affixed to jaw 121 as by brazing. In the alternative, pad 133–1 may be detachably connected with jaw 121 by bolting as in the previously described embodiment or by any of a variety of slidable connecting means. Diaphragm 135 performs the same function in this embodiment as diaphragm 35 in the previously described embodiment.

DEFINITIONS

In this application, the term "paint" is meant to include pigment and/or particulate filler in an electro-depositable organic binder, the binder without pigment and/or particulate filler or having very little of the same. Thus, the organic binder which is ultimately converted to a durable film can be all or virtually all that is used to form the film, or it can be a vehicle for pigmentary and/or particulate filler material.

The terms "threshold deposition voltage" and "threshold voltage" refer to the minimum voltage at which significant deposition of an electrically resistant film occurs with the particular resin used. This will vary somewhat depending upon the composition of the resin. For polycarboxylic acid resins suitable for use in painting, the threshold voltage is ordinarily above about 5 and below about 20 volts. The maximum voltage that can be advantageously employed is also dependent upon the composition of the coating bath employed, particularly the film-forming resin therein, and is slightly below the "rupture voltage" of the particular film-former employed, i.e. that voltage at which deterioration of the deposited film is effected by maintaining such voltage throughout the selected residence time for the workpiece in the bath.

The embodiments described illustrate this invention but should not be considered as limitations upon the true scope of this invention as set forth in the appended claims.

We claim:

1. Apparatus for use in electrically inducing deposition of a film-forming organic coating material upon an electrical conductive substrate comprising in the combination container means adapted to contain an aqueous electrolyte having said organic coating material dispersed therein and a first electrode object to the coated when immersed in said electrolyte, a second electrode spaced apart from said first electrode and immersed in said electrolyte when said container means is charged therewith, a power source from which electrical energy can be transmitted through said circuit, first conduction means providing means for establishing electrical connection between said power source and said first electrode, second condition means providing electrical connection between said power source and said second electrode, and detachable connector means for providing electrical connection between said first electrode and said first conduction means, said connector means comprising in combination a connector-conductor, clamping means for holding said connector-conductor in electrical connection with said first electrode and said first conduction means, and resilient shielding means in contact with and substantially encompassing said connector-conductor and shielding at least a portion of said connector-conductor from contact with said coating material when said first electrode, said connector means and said first conduction means are in electrical connection and said first electrode and said connector means are immersed in said electrolyte.

2. Apparatus in accordance with claim 1 wherein said resilient shielding means is constructed and arranged to provide an essentially water-tight seal which circumscribes the area of contact between said connector-conductor and said first electrode when said clamping means is in closed position and said connector-conductor is held thereby in electrical connection with said first electrode and said first conduction means.

3. Apparatus in accordance with claim 1 wherein said clamping means of said detachable connector means is interposed between said first conduction mean sand said first electrode and constitutes a conductive segment of said electrical circuit.

4. Apparatus in accordance with claim 1 wherein said clamping means of said detachable connector means holds said first conduction means, said connector-conductor and said first electrode in electrical connection but does not constitute a requisite conductive segment of said electrical circuit.

References Cited

UNITED STATES PATENTS

| | | | |
|---|---|---|---|
| 1,906,378 | 5/1933 | Howard | 204—297 |
| 2,475,434 | 7/1949 | Moss | 204—297 |
| 3,024,184 | 3/1962 | Bowes, et al. | 204—300 |
| 3,053,749 | 9/1962 | Hoffert | 204—297 |
| 3,257,308 | 6/1966 | Cottom | 204—297 |

OTHER REFERENCES

Ser. No. 290,026, Weiner (A.P.C.), published July 13, 1943.

JOHN H. MACK, Primary Examiner

A. C. PRESCOTT, Assistant Examiner

U.S. Cl. X.R.

204—300, 181, 297